(12) United States Patent
Cotter

(10) Patent No.: US 8,567,227 B2
(45) Date of Patent: Oct. 29, 2013

(54) GUIDE AND RETENTION ASSEMBLY FOR A DIE SET

(75) Inventor: Jonathan P. Cotter, Dearborn, MI (US)

(73) Assignee: DADCO, Inc., Plymouth, MI (US)

( * ) Notice: Subject to any disclaimer, the term of this patent is extended or adjusted under 35 U.S.C. 154(b) by 805 days.

(21) Appl. No.: 12/701,313

(22) Filed: Feb. 5, 2010

(65) Prior Publication Data

US 2011/0192206 A1    Aug. 11, 2011

(51) Int. Cl.
  *B21D 37/12*    (2006.01)
  *B21B 45/02*    (2006.01)
  *F16M 13/00*    (2006.01)

(52) U.S. Cl.
  USPC .............. 72/455; 72/41; 248/580; 248/608

(58) Field of Classification Search
  USPC ............. 72/446, 448, 455, 60; 248/580, 608
  See application file for complete search history.

(56) References Cited

U.S. PATENT DOCUMENTS

| | | | | |
|---|---|---|---|---|
| 2,869,177 | A * | 1/1959 | Jurgeleit | .................. 100/258 R |
| 3,742,797 | A | 7/1973 | Vecchi | |
| 4,765,227 | A | 8/1988 | Balazs et al. | |
| 5,129,625 | A * | 7/1992 | Wood et al. | .................... 251/214 |
| 5,245,904 | A | 9/1993 | Meyerle | |
| 5,918,708 | A | 7/1999 | Yuda, Jr. et al. | |
| 6,848,290 | B2 | 2/2005 | Pyper et al. | |
| 6,862,983 | B2 * | 3/2005 | Bornhorst | ..................... 100/282 |
| 7,024,910 | B2 | 4/2006 | Pyper et al. | |
| 7,131,360 | B2 | 11/2006 | Irwin | |
| 7,152,451 | B1 | 12/2006 | Cotter | |
| 7,730,757 | B2 | 6/2010 | Pyper et al. | |
| 7,861,569 | B2 * | 1/2011 | Cotter et al. | .................... 72/351 |
| 7,950,262 | B2 | 5/2011 | Pyper et al. | |
| 8,186,196 | B2 * | 5/2012 | Schlatter | ........................... 72/43 |
| 8,206,449 | B2 * | 6/2012 | Jansen et al. | ............... 623/17.16 |
| 2005/0092151 | A1 * | 5/2005 | Rooney | ........................... 83/140 |
| 2008/0053186 | A1 | 3/2008 | Pyper et al. | |
| 2008/0143806 | A1 * | 6/2008 | Claeys | ......................... 347/102 |
| 2009/0193865 | A1 | 8/2009 | Pyper et al. | |
| 2009/0193951 | A1 | 8/2009 | Pyper et al. | |

FOREIGN PATENT DOCUMENTS

| | | |
|---|---|---|
| DE | 4128623 A1 | 4/1992 |
| EP | 0589684 A1 | 3/1994 |
| EP | 1767310 A2 | 3/2007 |
| FR | 2132515 A1 | 11/1972 |
| GB | 1104498 A | 2/1968 |
| JP | 2002066670 A | 3/2002 |

OTHER PUBLICATIONS

Barnes Group Inc., Raymond Nitrogen Gas Springs and Accessories Catalog, 1998, pp. 7, 22-23, printed in U.S.

Fibro, Fibro Standard Parts Catalog, 1998, p. D67, printed in Germany.

(Continued)

*Primary Examiner* — Dana Ross
*Assistant Examiner* — Lawrence Averick
(74) *Attorney, Agent, or Firm* — Reising Ethington P.C.

(57) ABSTRACT

A guide and retention assembly for spaced apart confronting plates of a die set for guiding the plates for relative reciprocal movement toward and away from the other. The assembly includes a housing with a mounting flange and a sleeve with a through bore, and a rod extending through the bore and slidably received in at least one bushing in the sleeve.

22 Claims, 4 Drawing Sheets

(56) References Cited

OTHER PUBLICATIONS

Steinel, Steinel Normalien GmbH Catalog, 1999, pp. 3.03, 3.17, 3.21-3.23, 3.46-3.54, 3.66, printed in Germany.
Kaller/Ogihara, Gas Springs Catalog, 2005, pp. 53, 61, printed in Japan.
Daimler Chrysler, Die Engineering Standards, Apr. 2005, pp. 1-8, 35-39, printed in U.S.
International Organization for Standardization (ISO), Tools for Pressing-Gas Springs, International Standard, Aug. 2008, Sections 3.4.1-3, printed in Switzerland.
Kaller, Gas Springs Catalog, Jun. 2002, pp. 2.2/5, 2.3/3, 2.4/7, printed in Sweden.
Power Components Inc., Power Mite Cylinders Catalog, 1980, Model No. 1010, printed in U.S.
Dadco, Inc., Nitrogen Gas Springs Catalog 92C124, 1992, p. 9, printed in U.S.
Dadco, Inc., Nitrogen Gas Springs Catalog 95C100, 1995, p. 5, printed in U.S.
Dadco, Inc., Nitrogen Gas Spring Rail Lifter Bulletin B03109, 2003, pp. 1-2, printed in U.S.
Dadco, Inc., Nitrogen Gas Spring Two Post Lifter Bulletin B05138, 2005, pp. 1-4, printed in U.S.
Indaya, Catalog, Feb. 2000, pp. F24, W09, printed in Spain and Germany.
Sankyo Oilless, Die Components Catalog, Jun. 2000, Section A-1 pp. 3, 15, 20, 23, 24, Section A-3 pp. 3-5, 8, 9, 27, Section C pp. 3-24, Section F pp. 3-11, Section J pp. 4-6, 14, 16-21, printed in Japan.
A. Cano Palmero, European Search Report, Application No. EP 11 15 1490, Oct. 14, 2011, 12 pp.

* cited by examiner

GUIDE AND RETENTION ASSEMBLY FOR A DIE SET

TECHNICAL FIELD

This disclosure relates generally to metalworking dies, and more particularly to die sets guiding reciprocal movement of dies or other tooling.

BACKGROUND

Metalworking dies, such as stamping, punching, piercing, blanking and shearing dies for sheet metal forming processes, commonly move toward and away from each other during the associated process. For many applications, upper and lower die halves or other tooling are respectively mounted on an upper plate and a lower plate of a die set having spools, rods, or the like aligning and guiding reciprocal movement of the superimposed plates and confronting die halves or other tooling toward and away from each other.

SUMMARY OF THE DISCLOSURE

One embodiment of a guide and retention assembly may include a rod, and one or more bushing(s) slidably received in a housing. The housing may have a flange portion, a sleeve portion, and a bore through them. The flange portion is constructed to be connected to a first plate, and the sleeve portion is constructed to be received in a hole in the first plate. The rod is constructed to be connected to a second plate that confronts the first plate during the associated process. The bushing(s) is located in the bore and provides a bearing for reciprocatory movement of the rod in the bore to guide reciprocatory movement of the plates.

To prevent contaminants from entering the bushings, the guide and retention assembly may include first and second wiper seals slidably receiving the rod and carried by the housing with the bushing(s) received between the wiper seals. To limit axial movement of the rod in one direction relative to the housing, the rod may have a stop adjacent one end engageable with a free end of the sleeve and/or a resilient damper adjacent a free end of the sleeve. The damper may be part of or integral with a wiper seal adjacent the free end of the sleeve. To inhibit the rod from axially moving in the other direction far enough to unintentionally come out of the housing prior to mounting the guide and retention assembly in the die set or directly in die halves, the rod may have a groove adjacent its other end which releasably engages a wiper seal adjacent the other end of the housing.

Some of the objects, features, and advantages of the exemplary guide and retention assembly include providing proper connection, support, and guiding of opposing plates or dies in a metalworking process, insuring proper lubrication of the bushing and rod, preventing contamination of the bushing, providing an assembly construction that is rugged, durable, of relatively simple design and economical manufacture and assembly, and in service has a long useful life. None, some, or all of these advantages may be achieved by various embodiments of the guide and retention assembly disclosed herein.

BRIEF DESCRIPTION OF THE DRAWINGS

The following detailed description of exemplary embodiments and best mode will be set forth with reference to the accompanying drawings, in which.

DETAILED DESCRIPTION OF PREFERRED EMBODIMENTS

Figure 1:
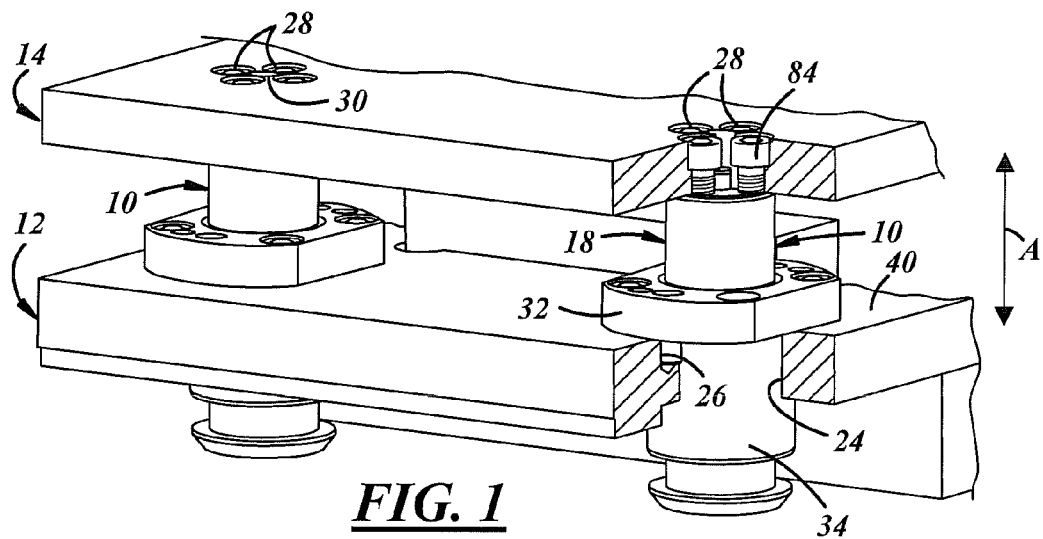
FIG. 1 is a perspective view of an exemplary embodiment of a guide and retention assembly in an exemplary shoe plate and pad plate of a die set.

Referring in more detail to the drawings, FIGS. 1-8 show an exemplary embodiment of a guide and retention assembly 10 (hereafter assembly) that is used to align and guide reciprocal or back-and-forth movement of dies or other tooling in a metalworking process such as stamping, drawing, punching, piercing, blanking or shearing processes. The assembly 10 provides alignment of and guidance for reciprocal movement of a plate 14 such as a stripper, rail or pad relative to a plate 12 such as a base or shoe of a die set. Typically, confronting die halves or other tooling are removably mounted on the upper and lower plates. In use, the die set with the die halves or other tooling mounted therein is received between the platens of a press which typically reciprocates the upper die half toward and away from the lower die half. In the exemplary embodiment, the assembly 10 includes a rod 18 slidably received in one or more bushings disposed in a housing 16 between a first seal 20 and a second seal 22.

Referring to FIG. 1, the first plate 12 has a through-hole 24 for each assembly 10 that is connected to the first plate, and has threaded apertures 26 and locator apertures (not shown) for mounting the housing 16 on the plate. The second plate 14 has countersunk apertures 28 and locator apertures 30 for attaching the rod 18 to the plate.

Preferably, the housing 16 is a one-piece structure but may be a multi-piece structure with separate pieces that are welded or otherwise attached to one another. The housing 16 is preferably made out of steel such as the carbon steel designated by AISI 1020; of course, other suitable materials are possible such as other metals and composites.

Figure 2:
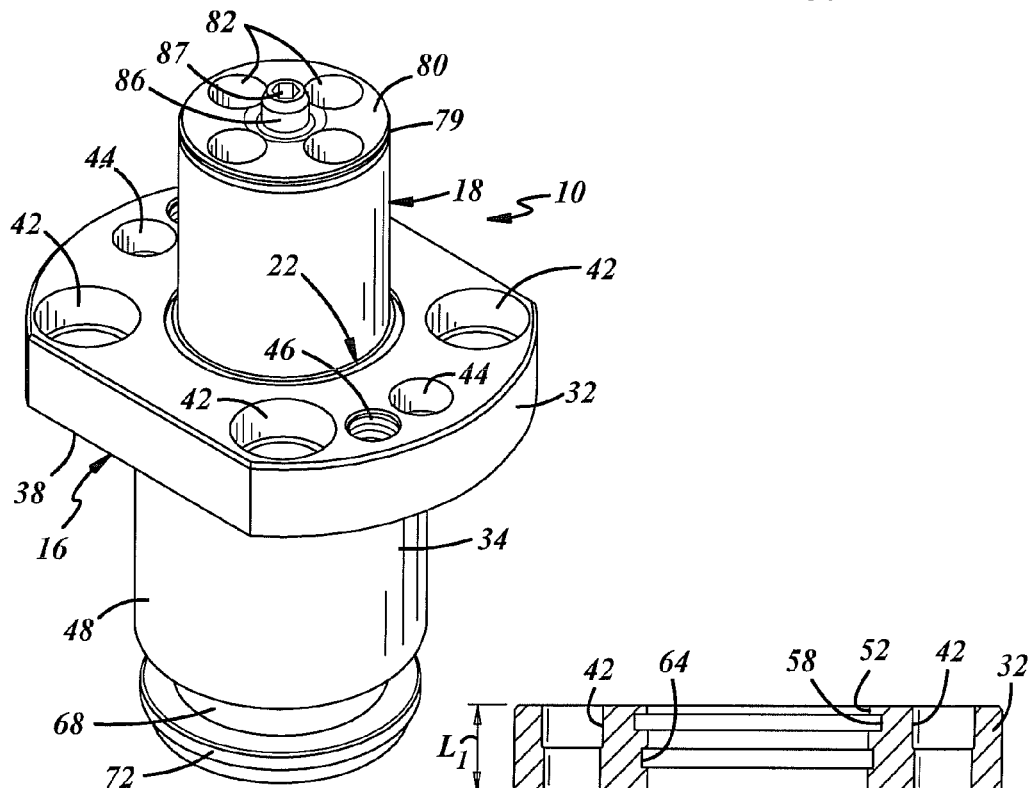
FIG. 2 is a perspective view of the guide and retention assembly of FIG. 1.
Figure 5:
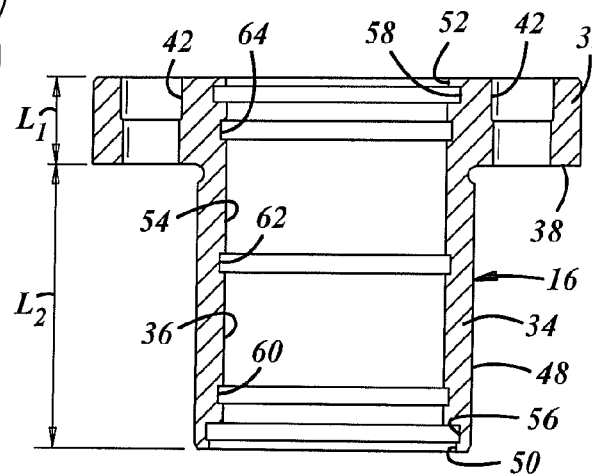
FIG. 5 is a cross-sectional view of an exemplary embodiment of a housing of the guide and retention assembly of FIG. 1.

Referring to FIGS. 1, 2 and 5, the housing 16 has a mounting flange portion 32, a sleeve portion 34, and a bore 36. The flange 32 is radially enlarged with respect to the sleeve 34 and is a radially protruding structure with respect to the axis of the bore 36. The flange portion 32 is used for mounting the housing 16 to the first plate 12 and has a mounting surface 38, or shoulder surface, which confronts and sits abuttingly against an outer surface 40 of the first plate 12 when the housing 16 is connected to the first plate. Non-threaded countersunk apertures 42 through the flange portion 32 are located for coaxial alignment with respective threaded apertures 26 of the first plate 12. Fasteners, such as cap screws, attach the flange portion 32 to the first plate 12 by way of the apertures 42, 26. Locator apertures 44 through the flange portion 32 may receive locator pins fixed in apertures in the first die plate 12. Threaded apertures 46 are located in the flange portion 32 for receiving a tool such as a jackscrew to assist in removing the housing 16 from the first die plate 12.

The sleeve portion 34 projects or extends from the flange portion 32 and is inserted partially or wholly in the through-hole 24 of the first die plate 12 and, as shown in FIG. 1, can extended beyond the through-hole. If closely received in the through-hole 24, the sleeve 34 may provide a more stable mounting of the housing 16 in the first die plate 12, as compared to a housing without a sleeve or other structure received in the through-hole 24. The sleeve portion 34 also provides a greater maximum axial length of engagement of the bushings between the housing 16 and rod 18 and therefore greater lateral or radial support and improved axial guidance of the rod 18 for reciprocation of the rod. This greater axial extent also accommodates greater bushing surface area and lubrication capacity in the bore 36 for the rod 18. The sleeve portion 34 preferably has a cylindrical outer surface 48.

In one embodiment, the flange and sleeve portions 32, 34 have respective total axial lengths $L_1$, $L_2$ (FIG. 5) that are optimized for connecting the housing 16 to the first die 12 and for supporting and guiding movement of the rod 18. In one example, the axial length $L_2$ of the sleeve portion 34 is approximately two times (2×) the axial length $L_1$ of the flange portion 32; in another example, the axial length $L_2$ is approximately three times the axial length $L_1$; and in yet another example, the axial length $L_2$ can be approximately four to eight times the axial length $L_1$ (e.g., $L_2$ is 2.0 inches and $L_1$ is 0.5 inches; of course other dimensions are possible). The exact values of the axial lengths $L_1$, $L_2$ can depend on, among other things, the expected axial and lateral loads transmitted to the housing 16 during use, and the axial length and diameter of the rod 18. In some cases, satisfying these relationships can help ensure proper connection, support, and guiding of the plates 12, 14 and dies or other tooling mounted on the plates.

Still referring to FIGS. 1, 2, and 5, the bore 36 extends through the flange portion 32 and through the sleeve portion 34, and receives the rod 18. The bore 36 is generally cylindrical with a first open end 50 at a free end of the sleeve portion 34, and a second open end 52 at an end face of the flange portion 32. The bore 36 also has an inner surface 54 with a first groove 56 adjacent the first open end 50 for seating the first wiper seal 20 in assembly and a second groove 58 adjacent the second open end 52 for seating the second wiper seal 22 in assembly. For retaining the bushings, the bore 36 also has axially spaced apart third, fourth, and fifth grooves 60, 62, 64 which are also axially spaced from and received between the first and second grooves 56, 58.

With the exception of a few relatively minor structures, such as apertures, the rod 18 is a mostly a solid cylindrical piece. Preferably, the rod 18 is made out of steel such as the high grade steel 42CrMo4; of course other suitable materials are possible such as other metals and composites. The rod 18 is ground within relatively tight tolerances and a high quality surface finish, and is preferably treated with a nitride surface treatment for hardening and corrosion resistance.

Referring to FIGS. 2, 3, 7, and 8, the rod 18 has an outer surface 66, a first end 68, and a second end 70. Near the first end 68, a stop 72, preferably in the form of a ring, is fixed to the rod 18 via an interference fit with an intermediate annular wire 74 which is received in a first groove 76 in the outer surface 66 of the rod and a complementary groove 77 in the stop ring 72. The stop could be fixed to the rod in other ways such as by welding, snap ring retainers, etc. The stop 72 provides a radial protrusion with respect to the cylindrical shape of the primary body of the rod 18, and preferably is positioned substantially flush with the first end 68 of the rod. In other examples, the stop could have other structures such as a flange integral with the rod, a segmented cylindrical protrusion including separate and distinct arcuate segments and could be axially spaced away from the first end 68 of the rod. Near the second end 70, a circumferentially continuous second groove 79 is located in the outer surface 66 for cooperation with the wiper seal 22 for releasably retaining the rod 18 in the housing.

At a second free end 80 of the rod 18, threaded blind apertures 82 extend axially into the rod for receiving threaded fasteners such as cap screws 84 to attach the rod to the upper plate 14. A locator 86 with a cylindrical surface coaxial with the axis of rotation of the rod 18 projects from the end face 80 and provides a locator rotatably receivable with a close fit in locator aperture 30 in the upper plate. A non-circular socket 87 in the free end of the locator 86 is configured to receive a complementary tool or driver such as an Allen wrench for rotating the rod 18 to coaxially align the threaded apertures 82 in the rod end with the apertures 28 in the plate for installation of the cap screws 84 to attach the rod to the plate. In other embodiments, other constructions and ways may be used for connecting the rod 18 to the second plate 14; for example, a single cap screw and washer may be installed in a single threaded aperture in the free end of the rod and coaxial with the axis of rotation of the rod.

Figure 3:
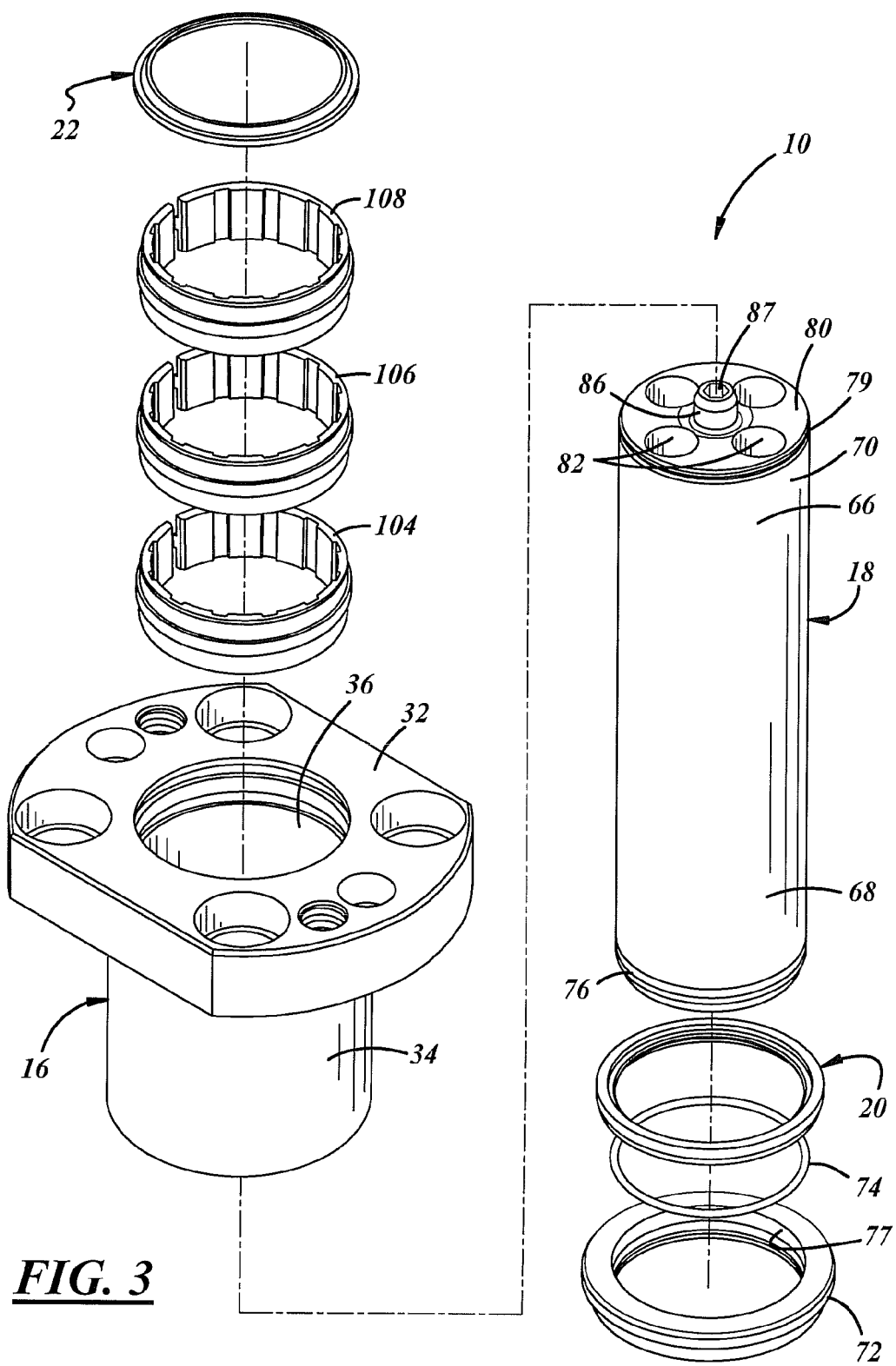
FIG. 3 is an exploded view of the guide and retention assembly of FIG. 1.
Figure 4:
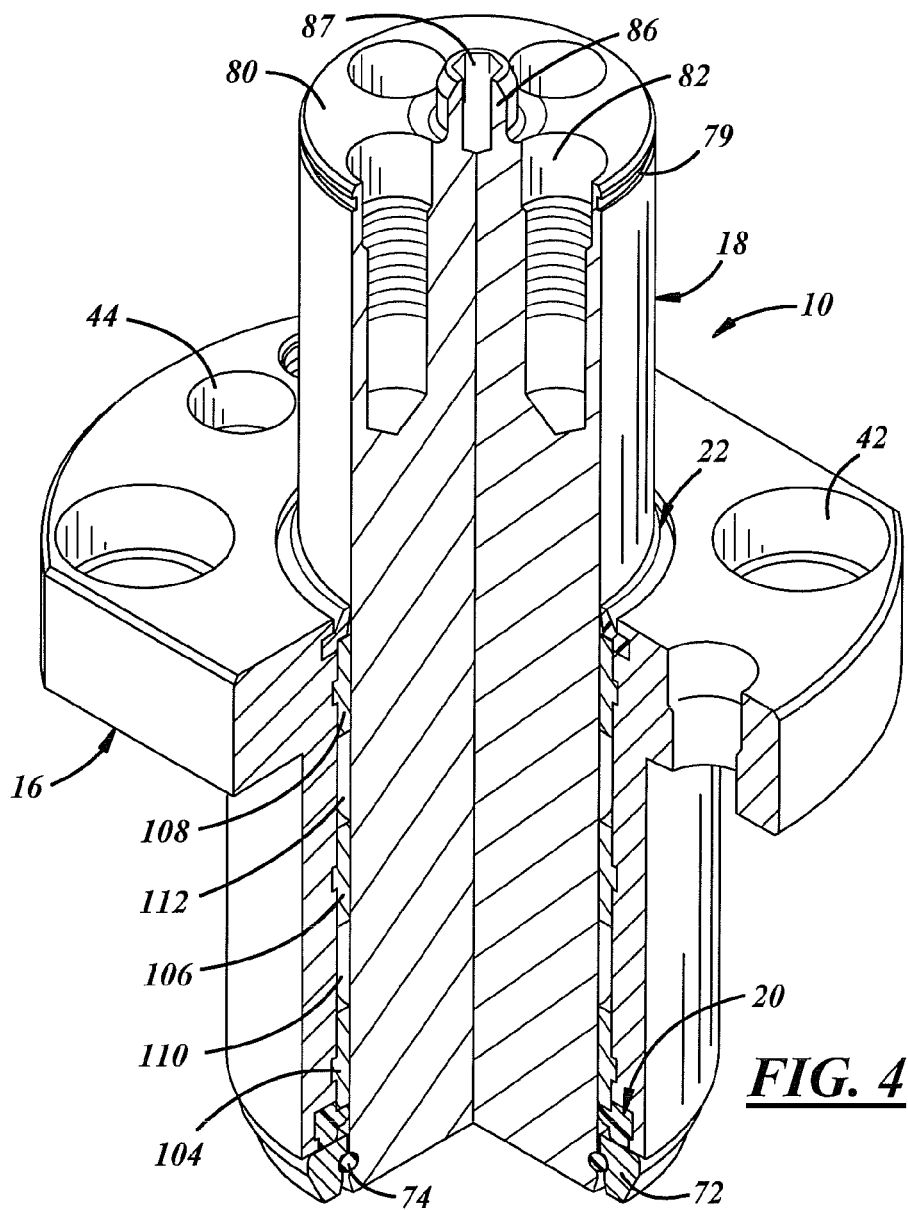
FIG. 4 is cross-sectional view of the guide and retention assembly of FIG. 1.
Figure 7:
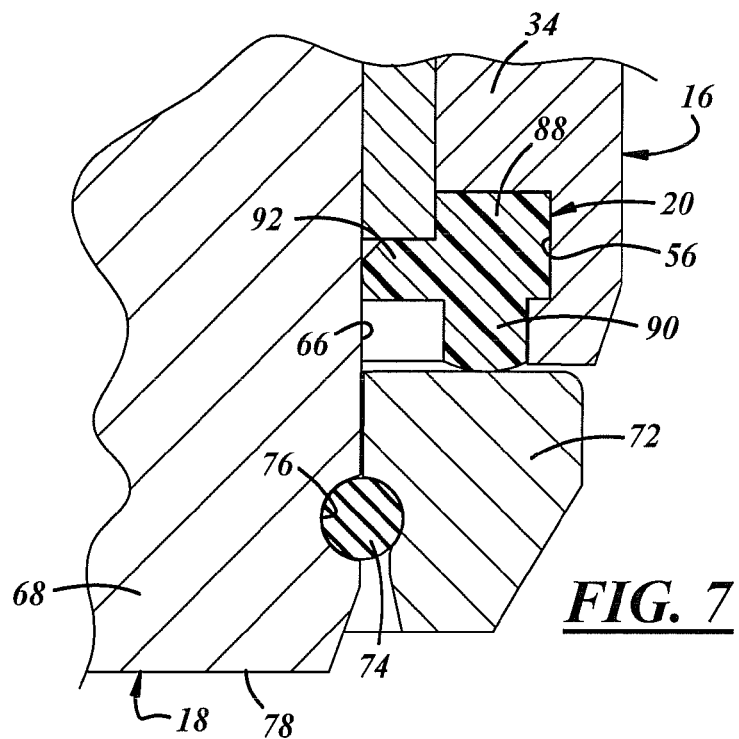
FIG. 7 is an enlarged view of an exemplary embodiment of a first wiper seal of the guide and retention assembly of FIG. 1.

The first wiper seal 20 prevents contaminants from entering the bore 36 through the first end 50, and preferably also dampens impact caused by contact with the stop 72 of the rod 18. Referring to FIGS. 3, 4, and 7, in assembly, the first wiper seal 20 continuously engages the rod 18 and cleans the rod of contaminants as the rod slides therethrough. Preferably, the first seal 20 also substantially prevents direct metal-to-metal contact between the stop 72 and the housing sleeve 34 (instead provides elastomeric-to-metal contact before, if any, metal-to-metal contact) and, through direct engagement and abutment with the stop, provides a damper and may limit further movement of the rod 18 while allowing movement in the opposite direction where the stop is moved away from the end of the sleeve portion 34. The first seal 20 is preferably made of polyurethane 90a available from Dow Chemical Company of Midland, Mich. and could be made of other materials such as other polyurethanes or other durable and somewhat resilient polymers with a durometer in the range of about 70 to 100 and preferably 85 to 95 of the Shore A durometer scale.

The first seal 20 has a circumferentially continuous annular ring structure with a base portion 88, a bumper portion 90, and a wiper portion 92. In assembly, the base portion 88 of the seal 20 is received in the first groove 56 of the housing, the bumper portion 90 projects axially beyond the free end of the sleeve 34 for direct engagement by the stop ring 72 and the wiper portion 92 circumferentially continuously engages the cylindrical surface 66 of the rod to wipe off any contaminants and prevent them from entering the bore 36. In other embodiments, the bumper can be a separate ring of a somewhat resilient polyurethane or other elastomer separate from a suitable wiper seal, the first seal 20 can be located axially inward or outward of the free end of the sleeve portion 34, or the first seal need not be provided.

Figure 8:
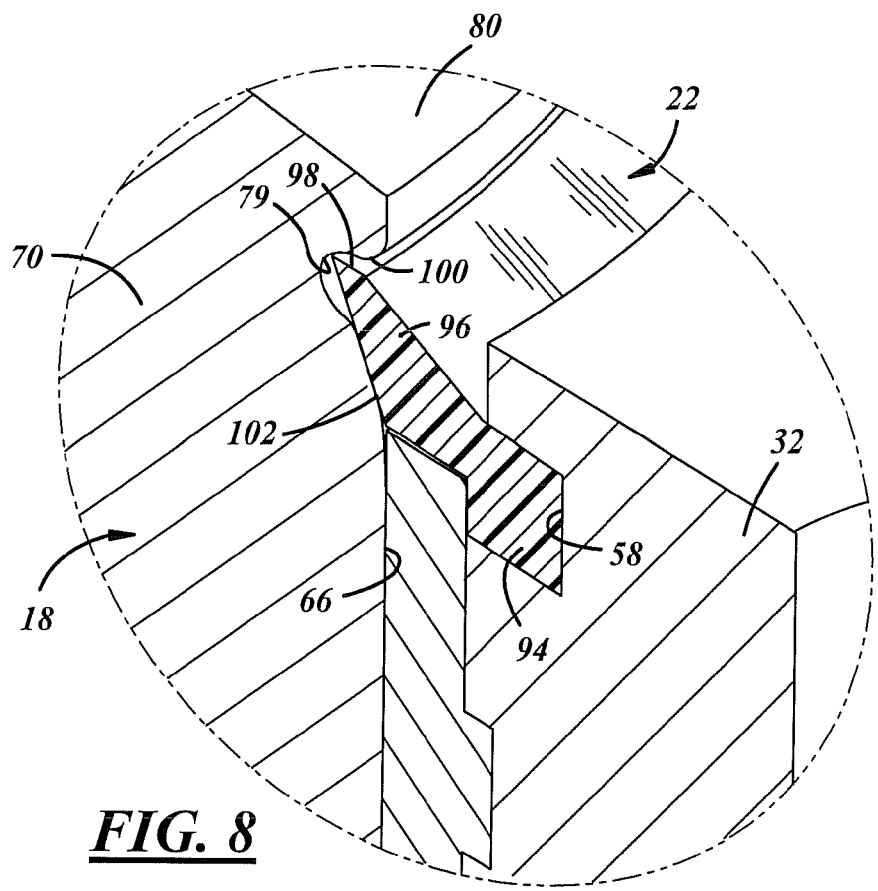
FIG. 8 is an enlarged view of an exemplary embodiment of a second seal of the guide and retention assembly of FIG. 1 engaging a groove in a rod of the assembly.

The second seal 22 prevents contaminants from entering the bore 36 from the second end 52, and cooperates with the second groove 79 to releasably retain the rod 18 in the housing 16. Referring to FIGS. 3, 4, and 8, in assembly, the second seal 22 bears against the rod 18 and cleans the rod of contaminants as the rod slides therethrough. The second seal 22 also, through direct engagement with the second groove 79, serves as a positive check to limit further movement of the rod 18 into and through the casing while allowing movement in the opposite direction where the second groove is moved away from the flange portion 32. For example, during transport, assembly, or disassembly when the rod 18 is not connected to the second die 14, the rod could unintentionally slide through the bore 36 in the direction where the second free end 80 moves toward the flange portion 32. Instead of continuing its sliding movement, when the second groove 79 is engaged by the second seal 22, the rod 18 is releasably held in the housing and prevented from further axial sliding movement. The second seal 22 preferably is made of a somewhat flexible and resilient polymer such as polyurethane 90a available from Dow Chemical Company and could be made of other materials such as other polyurethanes or other durable and somewhat flexible and resilient polymers having a durometer in the range of about 70 to 100 and preferably about 85 to 95 on the Shore A durometer scale.

Referring to FIGS. 3, 4 and 8, the second seal 22 has a circumferentially continuous annular ring structure with a base portion 94 which in assembly is received in the second groove 58 in the bore 36 and a wiper portion 96 with a tip 98 which in assembly circumferentially continuously directly engages the rod 18 to wipe its outer surface 66 clean of any contaminants.

As shown in FIG. 8, in cross section the wiper portion 96 tapers inwardly toward the tip 98 and is inclined away from the bore and at an acute included angle to the axis of the bore 36 and rod 18. If the rod 18 moves sufficiently into the housing 16, the flexible tip 98 of the seal will enter into the groove 79 in the rod when they become aligned as shown in FIG. 8 to releasably retain the rod 18 and to prevent unintentional removal of the rod 18 from the housing. To reliably avoid damage to the seal tip 98 and facilitate insertion of the rod into and removal from the housing, preferably the groove 79 has a generally semicircular cross section with rounded edges 100 providing a smooth transition from the adjacent cylindrical surface 66 into and out of the groove 79. In other embodiments, this retention feature can be eliminated such as by omitting the groove 79 and/or a second seal 22 can be axially located inward or outward of the end face of the flange portion 32, or the second seal may not be provided.

If contaminants get into the bore 36, they can degrade lubrication, damage the surface 66 of the rod, increase wear of the bushings disposed in the bore, and can ultimately worsen performance and significantly shorten the in-service useful life of a guide and retention assembly. The first and second seals 20, 22 of the assembly 10 prevent at least most contaminants from entering the bore and retain lubricant in the bore to provide permanent lubrication of the bushings. In most cases, the assembly 10 will result in significantly improved performance and extended in service useful life.

Figure 6:
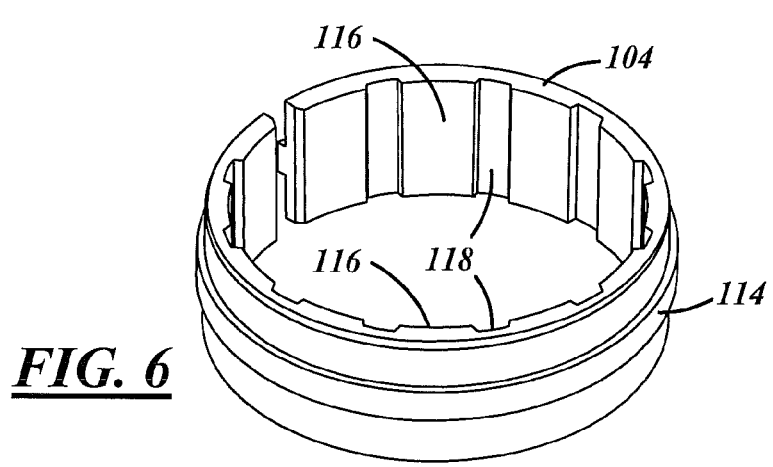
FIG. 6 is a perspective view of an exemplary embodiment of a bushing of the guide and retention assembly of FIG. 1.

One or more bushings are located in the bore 36 to facilitate reciprocatory linear movement and restrain lateral movement of the rod 18 in the housing. The exact number of bushing can depend on, among other things, the axial extent of the bore, the axial extent of the rod 18, the axial extent of the particular bushing(s) and the axial and lateral loading to which the assembly may be subjected in use. Referring to FIGS. 3, 4, and 6, a first, second, and third bushings 104, 106, 108 are located in the bore 36 and radially between the housing 16 and the rod 18. Each bushing is axially spaced from its adjacent bushing in order to form a space 110 or 112 therebetween which can be filled with lubricant to facilitate low friction movement of the rod 18 and minimize wear between the rod and the bushings. Each bushing 104, 106, 108 has a split annular structure with a rib 114 located on its outer surface which, in assembly, is received in the respective groove 60, 62, 64 of the bore 36 to establish and maintain the position of each bushing in the bore. Each bushing has an inner bearing surface 116 and preferably circumferentially spaced apart axial grooves or recesses 118 to further facilitate lubrication. The bushings 104, 106, 108 can be removed from the bore 36 for service or replacement altogether. Preferably, the split bushings 104, 106 and 108 are made of a composite plastic or polymer material with filler materials and reinforced with fibers. However, removable bushings could be made of a material such a brass, bronze or a sintered powdered metal impregnated with a lubricant.

Alternatively, one or more or all of the bushings 104, 106 and 108 can be a homogenously integral portion of a sleeve 34 made of a metal preferably of a metal such as a steel so that the surface 116 of the integral bushing can be hardened such as by heat treating or nitriding or providing a titanium coating on at least the surface 116. If desired, circumferentially spaced grooves 118 can also be provided in the integral bearing portion of the sleeve to further facilitate lubrication.

In other embodiments not shown in the drawings, the guide and retention assembly could have different configurations. For example, the housing could be flipped over 180° from its configuration shown in FIGS. 1 and 2, and the rod inserted through the flange end of the housing. In other words, in this configuration, the flange portion would be located near and would oppose the stop 72 of the rod and the free end of the sleeve portion would be located adjacent the opposite end 80 of the rod with the apertures 82 therein. The location of the first and second wiper seals 20 and 22 could also be reversed to provide the damper and releasable rod retention features. This configuration of the guide and retention assembly could be installed in the through-hole 24 of the first plate 12 from an opposite direction than that shown in FIG. 1 with the flange 32 bearing on the opposite face of the plate 12.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention as defined by the following claims.

The invention claimed is:

1. A guide and retention assembly for spaced-apart plates comprising:
 a housing having a flange, a sleeve, and a bore through the flange and sleeve, the flange constructed for attachment to a first plate with the sleeve received in a hole in the first plate;
 at least one bushing received in the bore and located in the sleeve; and
 a rod slidably received in the bushing for axial reciprocation relative to the housing, a groove in the rod and adjacent one end of the rod, and the rod adjacent the one end is constructed for attachment to a second plate that confronts the first plate;
 a stop carried by the rod adjacent an other end of the rod, extending radially outward of the rod and engageable with the sleeve to limit axial movement of the rod in one direction relative to the housing;
 a wiper seal adjacent the flange end of the bore and bearing on the rod to prevent contaminants from entering the bore and the wiper seal can be received in the groove to releasably retain the rod in the housing and releasably limit axial movement of the rod relative to the housing in a direction opposite to the one direction; and another wiper seal carried by the sleeve and adjacent an end of the bore distal from the flange and bearing on the rod to prevent contaminants from entering the bore, and the stop is engageable with the another wiper seal to cushion further axial movement of the rod in the one direction relative to the housing.

2. The guide and retention assembly of claim 1 wherein the flange and sleeve of the housing is a one-piece structure.

3. The guide and retention assembly of claim 1 wherein the at least one bushing includes a first bushing and a second bushing axially spaced from the first bushing, a space located between the first and second bushings for receiving lubricant therein.

4. The guide and retention assembly of claim 3 wherein the at least one bushing includes a third bushing axially spaced away from the second bushing, and a second space located between the second and third bushings for receiving lubricant therein.

5. The guide and retention assembly of claim 1 wherein the stop is located near the one end of the rod, and wherein the another wiper seal is located near an end of the sleeve distal from the flange of the housing.

6. The guide and retention assembly of claim 1 wherein the total axial length ($L_2$) of the sleeve is at least four times the total axial length $L_{(1)}$ of the flange.

7. A guide and retention assembly for spaced-apart plates comprising:
a housing having a flange, a sleeve, and a bore through the flange and sleeve, the flange constructed for attachment to a first plate with the sleeve received in a hole in the first plate;
at least one bushing received in the bore and located in the sleeve; and
a rod slidably received in the bushing for axial reciprocation relative to the housing, the rod constructed for attachment to a second plate that confronts the first plate; and a groove in the rod and the groove is located near the construction for attachment of the rod to the second plate;
a wiper seal located near an end of the bore and bearing on the rod to prevent contaminants from entering the bore, and the wiper seal can also be received in the groove to releasably retain the rod in the housing; and
wherein the wiper seal and associated end of the bore are located at the flange of the housing.

8. The guide and retention assembly of claim 7 wherein the total axial length of the sleeve of the housing is at least two times the total axial length of the flange of the housing.

9. The guide and retention assembly of claim 7 wherein the at least one bushing is an inner cylindrical surface of the sleeve coaxial with the bore.

10. The guide and retention assembly of claim 9 wherein the sleeve is made of a heat treatable metal and the inner cylindrical surface comprising the at least one bushing is hardened.

11. The guide and retention assembly of claim 9 wherein the sleeve is made of a metal and the inner cylindrical surface comprising the at least one bushing has a titanium coating thereon.

12. A guide and retention assembly for spaced-apart first and second plates comprising:
a housing having a through bore with first and second ends and constructed for attachment adjacent the first end of the bore to a first plate;
at least one bushing received in the bore and carried by the housing;
a rod with first and second ends, constructed for attachment adjacent a first end of the rod to a second plate, slidably received in the bushing and extending through the bore and the housing for axial reciprocation of the rod relative to the housing;
a first wiper seal carried by the housing near the first end of the bore and circumferentially continuously bearing on the rod to prevent contaminants from entering the bore;
a second wiper seal carried by the housing near the second end of the bore and circumferentially continuously bearing on the rod to prevent contaminants from entering the bore;
the bushing being received between the first and second seals;
a stop carried by the rod near the second end of the rod and extending radially outwardly of the rod for engagement with the housing near the second end of the bore to limit axial movement of the rod in a first axial direction relative to the housing; and
a groove in the rod near the first end of the rod and releasably engageable with the first wiper seal near the first end of the bore to releasably limit the extent of axial movement of the rod relative to the housing in a second axial direction opposite to the first axial direction.

13. The guide and retention assembly of claim 12 wherein the housing is a one-piece structure having a flange portion and a sleeve portion, the flange portion constructed to be connected to the first plate, the sleeve portion constructed for receipt in a hole in the first plate, and the bore extending through the flange portion and through the sleeve portion.

14. The guide and retention assembly of claim 13 wherein the at least one bushing includes a first bushing and a second bushing axially spaced from the first bushing with a space between the first and second bushings for receiving a lubricant therein.

15. The guide and retention assembly of claim 12 wherein the housing is a one-piece structure having a flange portion and a sleeve portion and the at least one bushing is an inner cylindrical surface of the sleeve coaxial with the bore.

16. The guide and retention assembly of claim 15 wherein the sleeve is made of a heat treatable metal and the inner cylindrical surface comprising the at least one bushing is hardened.

17. The guide and retention assembly of claim 15 wherein the sleeve is made of a metal and the inner cylindrical surface comprising the at least one bushing has a titanium coating thereon.

18. The guide and retention assembly of claim 12 wherein the second wiper seal comprises an elastomer having a durometer of about 70 to 100 on the Shore A scale and engagement of the stop with the second wiper seal dampens further axial movement of the rod in the first axial direction.

19. The guide and retention assembly of claim 1 wherein the another wiper seal comprises an elastomer having a durometer of about 70 to 100 on the shore A scale and engagement of the stop with the another wiper seal dampens further axial movement of the rod in the one direction relative to the housing.

20. The guide and retention assembly of claim 7 wherein the at least one bushing includes a first bushing and a second bushing axially spaced from the first bushing, a space located between the first and second bushings for receiving lubricant therein.

21. The guide and retention assembly of claim 7 wherein the total axial length ($L_2$) of the sleeve is at least four times the total axial length $L_{(1)}$ of the flange.

22. The guide and retention assembly of claim 7 which also comprises a stop carried by the rod and another wiper seal carried by the sleeve adjacent an end of the bore distal from the flange, bearing on the rod to prevent contaminants from entering the bore, and the stoop is engageable with the another wiper seal to cushion further axial movement of the rod in one direction relative to the housing.

* * * * *